(12) United States Patent
Dang et al.

(10) Patent No.: US 12,189,585 B2
(45) Date of Patent: Jan. 7, 2025

(54) SCHEMA EVOLUTION ON A LIVE DATABASE SYSTEM WITHOUT AN OUTAGE

(71) Applicant: International Business Machines Corporation, Armonk, NY (US)

(72) Inventors: Tammie Dang, San Jose, CA (US); Thomas Eng, San Jose, CA (US); Shengxi Suo, San Jose, CA (US); Euna Park, Santa Clara, CA (US); Fen-Ling Lin, San Jose, CA (US); Claire McFeely, San Jose, CA (US); John Joseph Campbell, Alton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/188,690

(22) Filed: Mar. 23, 2023

(65) Prior Publication Data
US 2024/0320197 A1  Sep. 26, 2024

(51) Int. Cl.
G06F 17/30 (2006.01)
G06F 9/48 (2006.01)
G06F 16/21 (2019.01)

(52) U.S. Cl.
CPC .......... G06F 16/213 (2019.01); G06F 9/4843 (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS 5,970,488 A * 10/1999 Crowe .................... G06F 16/27
707/999.01
6,636,861 B1 * 10/2003 Stack .................... G06F 16/258
709/219
6,804,339 B1 * 10/2004 Hettish ............... H04M 1/2473
379/201.01

(Continued)

OTHER PUBLICATIONS

DSN_PROFILE_ATTRIBUTES profile table; IBM Docs; [online]; [retrieved on Feb. 17, 2023]; retrieved from the Internet https://www.ibm.com/docs.en/db2-forzox;12?topic=tables-dsn-profile-attributes; 24 pages.

(Continued)

*Primary Examiner* — Hung D Le
(74) *Attorney, Agent, or Firm* — CANTOR COLBURN LLP; Teddi Maranzano (57) ABSTRACT

Aspects of the invention include techniques for providing a schema evolution on a live database system without an outage. A non-limiting example method includes initiating a schema change on a live database system. The schema change includes an attribute for a database object. A first application package having a user application that is dependent on the database object and that is bound with a release(deallocate) option is identified. Existing threads and new threads executing the first application package are routed to execute the first application package with a release (commit) option and the schema change on the live database system is completed. One or more additional threads concurrently executing one or more additional application packages remain executing with the release(deallocate) option.

20 Claims, 6 Drawing Sheets

(56) References Cited

U.S. PATENT DOCUMENTS

| | | | | |
|---|---|---|---|---|
| 6,885,734 | B1* | 4/2005 | Eberle | H04M 3/4938 |
| | | | | 707/999.102 |
| 10,762,514 | B1* | 9/2020 | O'Toole | G06Q 30/0201 |
| 11,429,893 | B1* | 8/2022 | Tong | G06N 20/00 |
| 11,537,575 | B1* | 12/2022 | McNair | G06F 11/3409 |
| 11,568,006 | B1 | 1/2023 | Brannan et al. | |
| 2004/0003009 | A1* | 1/2004 | Wilmot | G06F 16/27 |
| 2004/0059701 | A1* | 3/2004 | Fedorov | H04M 3/5183 |
| 2005/0097247 | A1* | 5/2005 | Morrow | G06F 13/387 |
| | | | | 710/62 |
| 2006/0206894 | A1* | 9/2006 | Jung | G06F 9/4887 |
| | | | | 718/100 |
| 2009/0118019 | A1* | 5/2009 | Perlman | H04N 21/6125 |
| | | | | 463/42 |
| 2009/0319581 | A1* | 12/2009 | Seifert | G06F 16/22 |
| 2009/0327242 | A1* | 12/2009 | Brown | G06F 16/24549 |
| 2015/0355957 | A1* | 12/2015 | Steiner | G06F 21/552 |
| | | | | 714/37 |
| 2016/0070759 | A1* | 3/2016 | Huang | G06F 16/2458 |
| | | | | 707/769 |
| 2017/0351702 | A1* | 12/2017 | Schaefer | G06F 16/27 |
| 2019/0213618 | A1* | 7/2019 | Ahluwalia | H04L 67/564 |
| 2020/0038764 | A1* | 2/2020 | Perlman | H04N 21/2385 |
| 2020/0195494 | A1 | 6/2020 | Johnsen et al. | |
| 2021/0149915 | A1* | 5/2021 | Lee | G06F 16/2282 |
| 2022/0058179 | A1 | 2/2022 | Stolze et al. | |
| 2022/0171748 | A1* | 6/2022 | Bamel | G06F 11/1464 |
| 2022/0222224 | A1* | 7/2022 | Pandey | G06F 8/65 |
| 2023/0025502 | A1* | 1/2023 | Watanabe | G16H 30/20 |
| 2023/0298717 | A1* | 9/2023 | Sadauskas | A61B 5/7203 |
| | | | | 705/3 |
| 2023/0306014 | A1* | 9/2023 | Akella | G06F 16/2365 |

OTHER PUBLICATIONS

Overriding the RELEASE(DEALLOCATE) option for packages by using profile tables; IBM Docs; [online]; [retrieved on Feb. 17, 2023]; retrieved from the Internet https://www.ibm.com/docs/en/db2-for-zos/13?topic=mddatd-overriding-releasedeallocate-option-packages-by-using-profile-tables; 6 pages.

Setting special registers by using profile tables; IBM Docs; [online]; [retrieved on Feb. 17, 2023]; retrieved from the Internet https://www.ibm.com/docs/en/db2-for-zos/13?topic=connections-setting-special-registers-by-using-profile-tables; 9 pages.

* cited by examiner

PROFILE TABLE

| Profile ID | AUTHID | Client User ID | Client ApplName | Collection ID | Package ID |
|---|---|---|---|---|---|
| 9 | | | | C1 | |

*FIG. 3A*

PROFILE ATTRIBUTES TABLE

| Profile ID | KEYWORD | ATTRIBUTE1 | ATTRIBUTE2 |
|---|---|---|---|
| 9 | RELEASE PACKAGE | COMMIT | 2 |

*FIG. 3B*

PROFILE TABLE

| Profile ID | AUTHID | Client User ID | Client ApplName | Collection ID | Package ID |
|---|---|---|---|---|---|
| 10 | | | | C1 | P2 |
| 11 | | | | C2 | P3 |

*FIG. 4A*

PROFILE ATTRIBUTES TABLE

| Profile ID | KEYWORD | ATTRIBUTE1 | ATTRIBUTE2 |
|---|---|---|---|
| 10 | RELEASE PACKAGE | COMMIT | 2 |
| 11 | RELEASE PACKAGE | COMMIT | 2 |

*FIG. 4B*

PROFILE TABLE

| Profile ID | AUTHID | Client User ID | Client ApplName | Collection ID | Package ID |
|---|---|---|---|---|---|
| 9 | USRT001 | | | | |
| 10 | | SMITH | | | |
| 11 | | | PROJECTA | | |
| 12 | | | | COLLECTIONX | |

FIG. 5A

PROFILE ATTRIBUTES TABLE

| Profile ID | KEYWORD | ATTRIBUTE1 | ATTRIBUTE2 |
|---|---|---|---|
| 9 | SPECIAL REGISTER | SET CURRENT LOCK TIMEOUT = 5 | NULL |
| 10 | SPECIAL REGISTER | SET CURRENT LOCK TIMEOUT = 15 | 1 |
| 11 | SPECIAL REGISTER | SET CURRENT LOCK TIMEOUT = 35 | 1 |
| 11 | SPECIAL REGISTER | SET DEADLOCK RESOLUTION PRIORITY = 255 | 1 |
| 12 | SPECIAL REGISTER | SET CURRENT DEGREE = ANY | 2 |

SCHEMA EVOLUTION ON A LIVE DATABASE SYSTEM WITHOUT AN OUTAGE

STATEMENT REGARDING PRIOR DISCLOSURES BY THE INVENTOR OR A JOINT INVENTOR

The following disclosure(s) are submitted under 35 U.S.C. 102(b)(1)(A):

DISCLOSURES: *DSN_PROFILE_ATTRIBUTES profile table*, Db2 for z/OS, 13, 2023 Jan. 18, pages 1-24; *Setting special registers by using profile tables*, Db2 for z/OS, 13, 2023 Feb. 7, pages 1-9; and *Overriding the RELEASE(DEALLOCATE) option for packages by using profile tables*, Db2 for z/OS, 13, 2023 Jan. 25, pages 1-6.

BACKGROUND

The present invention generally relates to database management services, and more specifically, to computer systems, computer-implemented methods, and computer program products for providing a schema evolution on a live database system without an outage.

The database schema is the foundation of a database system, and determines how database data is stored, accessed, and manipulated. In essence, a schema is a blueprint or a design that defines the logical and physical structure of the respective database. In most implementations, a schema defines the organization of data and the relationships between different database entities, such as tables, columns, views, and indexes, as well as specifies the attributes and properties that each type of data can have and their respective constraints. For example, a schema for an e-commerce website may define tables for products, customers, orders, and payments, and each of these tables can have predetermined data types. Constraints can specify rules within the database, such as unique values for a column, minimum and maximum values for a cell, referential integrity between tables and/or table entries, etc.

Schema evolution refers to the process of modifying the structure or parameters of a database schema, often to accommodate changes in system or business requirements. A schema change can involve adding new tables to a database, modifying existing tables, adding or removing columns, modifying the relationships between tables, etc. A successful schema evolution can be challenging to implement, especially when the database system is live and serving a large number of users. A schema evolution often results in an outage—the respective database and any dependencies are taken offline so that the necessary schema changes can be made. This approach is straightforward but comes at the cost of downtime.

SUMMARY

Embodiments of the present invention are directed to techniques for providing a schema evolution on a live database system without an outage. A non-limiting example method includes initiating a schema change on a live database system. The schema change includes an attribute for a database object. A first application package having a user application that is dependent on the database object and that is bound with a release(deallocate) option is identified. Existing threads and new threads executing the first application package are routed to execute the first application package with a release(commit) option and the schema change on the live database system is completed. One or more additional threads concurrently executing one or more additional application packages remain executing with the release(deallocate) option.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified.

In the accompanying figures and following detailed description of the described embodiments of the invention, the various elements illustrated in the figures are provided with two or three-digit reference numbers. With minor exceptions, the leftmost digit(s) of each reference number correspond to the figure in which its element is first illustrated.

DETAILED DESCRIPTION

Implementing a schema change (i.e., a schema evolution) is critical for the ongoing maintenance and improvement of a database system. A successful schema evolution can allow an organization to adapt to changing workflows and requirements, enhance database performance, ensure data integrity, and better organize and maintain the database system. Without a schema evolution, a database system can become outdated, inefficient, and difficult to maintain.

A schema evolution relies upon Structured Query Language (SQL) statements for implementation. To illustrate, consider a scenario where related static SQL statements embedded in application programs are bound into database packages. The bind process takes various bind options and also records the database objects used by the SQL statements in the package as object dependencies in the catalog. When the application packages are executing the SQL statements, the packages reference database objects, such as tables, indexes, views, stored procedures, user-defined functions, sequences, etc. After the database objects are created their attributes may need to be changed (e.g., via a schema evolution). This can be accomplished using various Data Definition Language (DDL) ALTER SQL statements.

For a live schema evolution, the schema change will often need to be performed while one or more applications are executing, usually because there is no window (or only a very limited window) to quiesce applications in a busy production system. While running concurrently, the ALTER statement execution process needs to be serialized against the application package execution process to protect data integrity. The serialization mechanism is the package lock obtained by both processes in incompatible states.

In database transactions, the RELEASE option controls when an application releases a lock(s) that it acquired on objects, such as, partitions, tables, and table spaces that the application accesses. The RELEASE option used by an application package indicates either that the package and its lock are released (1) at end of transaction (COMMIT or ROLLBACK SQL statement) or (2) at the very end of the execution thread (DEALLOCATE).

Consider an application PY containing the following SQL statements:
SELECT * FROM Table1
COMMIT
INSERT INTO Table2 VALUES('abc');
Consider further that application PY is bound as a package COLLECTIONX.PY with the RELEASE(COMMIT) option, where "COLLECTIONX" is the collection identifier and "PY" is the package identifier. In some implementations, a database manager records package-object dependencies in a catalog. In above example, package COLLECTIONX.PY depends on both tables Table1 and Table2. If the SELECT statement uses an index access plan on an Index1, then this package also depends on Index1. When an application thread executes this package, it holds the package lock in share state.

Observe that a DDL thread executing an ALTER statement (e.g., ALTER Table1 ADD COLUMN C9 INTEGER) queries the catalog and requests the same package COLLECTIONX.PY lock in an exclusive state. For a live schema evolution, the lock ensures the package is not being used (i.e., no SQL referencing table Table1 is still active) before the table Table1 can be changed. Continuing with the prior example, where application PY is bound as a package COLLECTIONX.PY with the RELEASE(COMMIT) option, the DDL statement may be successfully executed when package COLLECTIONX.PY is done executing the COMMIT and before the INSERT statement is executed (the lock for this package is released on COMMIT).

Unfortunately, since the package COLLECTIONX.PY is released at COMMIT, the package needs to be located again at INSERT time (i.e., at the start/begin of the next transaction). To avoid this overhead, packages can be bound with the RELEASE(DEALLOCATE) option, which performs faster than RELEASE(COMMIT), but with the trade-off of potential DDL execution failures.

While online schema changes for database objects via DDL SQL statements are not required often, when there is a need, the change is typically urgent. Database managers often must make tough decisions between providing the best application performance (e.g., release on deallocate) vs. ensuring that a live schema evolution will execute correctly and fully (e.g., release on commit), ideally without causing a system and/or database outage.

This disclosure introduces methods, computing systems, and computer program products for providing a schema evolution on a live database system without an outage. In some embodiments, one or more application packages are identified that are bound with a RELEASE(DEALLOCATE) option and that are dependent on the to-be-changed objects in the schema evolution. In some embodiments, these application packages are gradually routed to RELEASE(COMMIT) behavior. When the schema change finishes, threads executing these applications can be routed back to the RELEASE(DEALLOCATE) option. Routing RELEASE behavior in this manner improves the chance of DDL success (due, e.g., to shorter contention time on the package locks) while still allowing for high performance characteristics (e.g., release on deallocate where possible).

Prior techniques to demote the RELEASE option value from DEALLOCATE to COMMIT behavior could be controlled by a subsystem parameter and/or a command and querying for lock waiter during COMMIT. This type of full-subsystem parameter approach has high granularity—all threads executing all packages will be affected when the subsystem parameter is enabled. As a result, this type of approach is only effective if all applications executing the dependent package reach COMMIT before the DDL thread expires (i.e., its waiting interval elapses).

Notably, configuring a schema evolution on a live database system in accordance with one or more embodiments described herein offers two native technical advantages over full-subsystem parameter approaches: (1) Only qualified application threads, which are reloading the package and relocked on subsequent transactions, incur the performance overhead of RELEASE(COMMIT); and (2) The likelihood of DDL success is increased because both existing and new application threads are addressed and dynamically changed to RELEASE(COMMIT) behavior during the online schema evolution period. In essence, the proposed method provides different filtering criteria to identify a subset of packages. Only threads executing the identified packages that have contention with the DDL statement will be affected. In particular, all threads (existing and new) will eventually execute the dependent packages with RELEASE(COMMIT) behavior and so long as the DDL statement is retried, the DDL statement will have a chance to break in and complete.

Schema evolution techniques described herein can be enforced using a variety of system configurations, such as, for example, via profile tables and/or profile attribute tables, APIs, GUIs, etc. It should be understood that, while some embodiments are described herein with respect to profile tables and/or profile attribute tables, this is done for ease of discussion and illustration. Other systems configurations are possible—for example, APIs and GUIs can be readily adapted to enforce a schema evolution workflow in a similar manner as described with respect to the profile tables and/or profile attribute tables, and all such configurations are within the contemplated scope of this disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
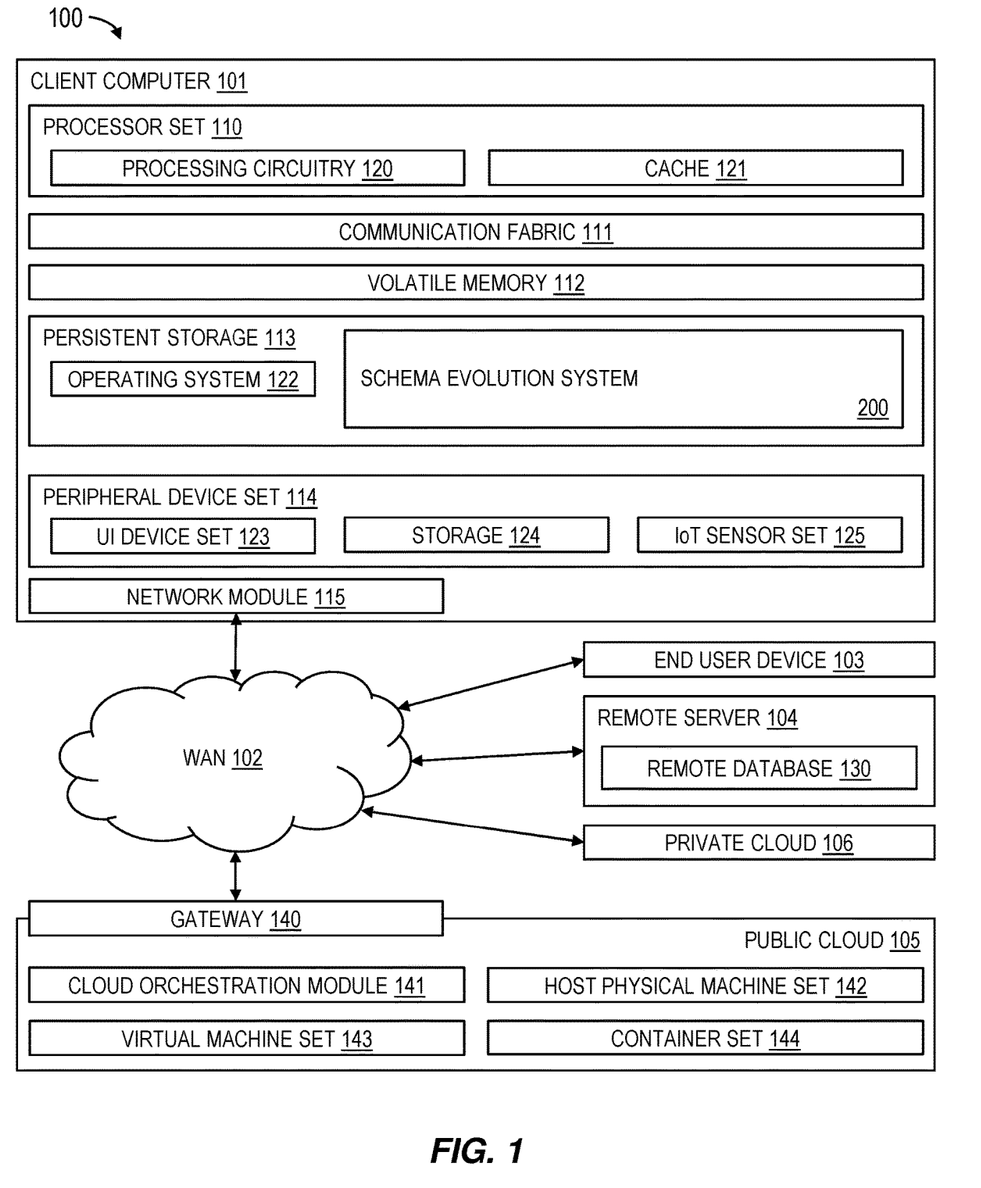
FIG. 1 depicts a block diagram of an example computing environment for use in conjunction with one or more embodiments of the present invention.

Referring now to FIG. 1, computing environment 100 contains an example of an environment for the execution of at least some of the computer code involved in performing the inventive methods, such as schema evolution system 200 (also referred to herein as block 200). In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

It is to be understood that the block diagram of FIG. 1 is not intended to indicate that the computing environment 100 is to include all of the components shown in FIG. 1. Rather, the computing environment 100 can include any appropriate fewer or additional components not illustrated in FIG. 1 (e.g., additional memory components, embedded controllers, modules, additional network interfaces, etc.). Further, the embodiments described herein with respect to the computing environment 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
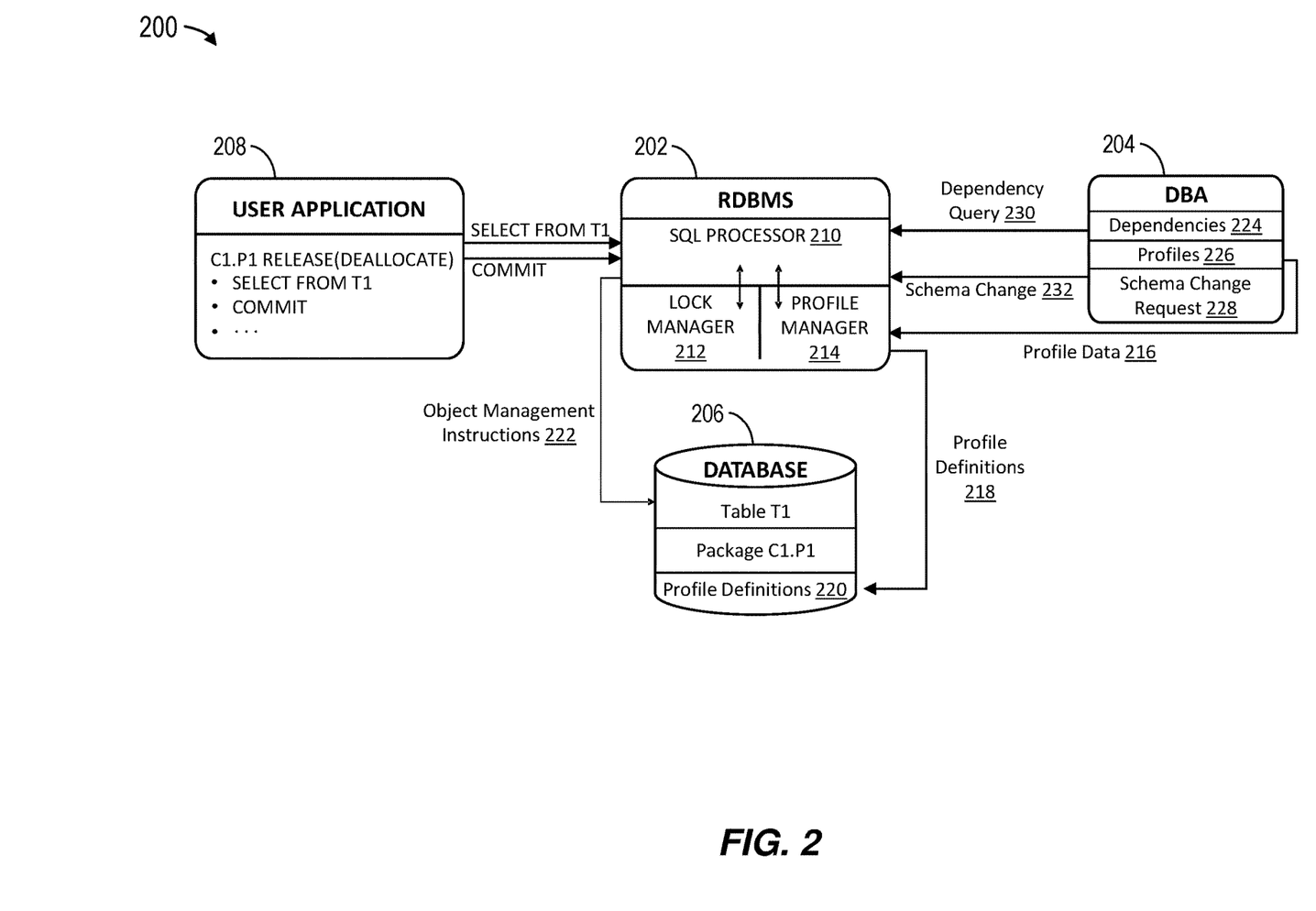
FIG. 2 depicts a block diagram of an example schema evolution system in accordance with one or more embodiments of the present invention.

FIG. 2 depicts a block diagram of an example schema evolution system 200 in accordance with one or more embodiments of the present invention. The schema evolution system 200 can include a relational database management system (RDBMS) 202, a database administrator (DBA) 204, a database 206, and a user application 208. The example schema evolution system 200 is shown having a single user application 208 and database 206 for ease of discussion and illustration. The number of applications, databases, and their respective properties (e.g., number of tables, packages, etc.) is not meant to be particularly limited and schema evolution systems having any number of applications and databases having any number of tables, packages, definitions, etc. are within the contemplated scope of this disclosure.

In some embodiments, the RDBMS 202 includes an SQL processor 210 and software and/or firmware for managing relational databases (e.g., the database 206). In some embodiments, the RDBMS 202 hardware, software, and/or firmware includes a set of tools and services for creating, maintaining, and querying the database 206. For example, in some embodiments, the RDBMS 202 includes a lock manager 212 and/or a profile manager 214.

In some embodiments, the SQL processor 210 is configured to execute SQL statements, such as, for example, DDL ALTER SQL statements. In some embodiments, the SQL processor 210 is communicatively coupled to the lock manager 212 to acquire necessary locks (e.g., in a shared state to satisfy a SELECT). In some embodiments, the lock manager 212 is configured to provide and release exclusive and/or shared locks for the SQL processor 210. In some embodiments, the SQL processor 210 is communicatively coupled to the profile manager 214. In some embodiments, the profile manager 214 is communicatively coupled to the DBA 204 to receive profile data 216 (e.g., to look up the RELEASE attributes for C1·P1). In some embodiments, the profile manager 214 is communicatively coupled to the database 206 to insert profile definitions 218.

In some embodiments, the DBA 204 is configured to check one or more dependencies 224, to define one or more profiles 226, and to initiate a schema change request 228 (e.g., for Table T1). In some embodiments, the DBA 204 is configured to override, via profile data 216, a package attribute (e.g., C1·P1) from RELEASE(DEALLOCATE) to RELEASE(COMMIT) behavior to facilitate the schema change request 228. In some embodiments, the profile data 216 (e.g., the release option downgrade to RELEASE (COMMIT)) is saved to the respective profile 226 for C1·P1.

In some embodiments, the DBA 204 is configured to query the SQL processor 210 for dependencies via a dependency query 230 (as shown, "Query T1 Dependency"). In some embodiments, the DBA 204 is configured to sent a schema change 232 (e.g., ALTER T1) to the SQL processor 210.

In some embodiments, the database 206 is a relational database. A relational database is a type of database that stores data in tables having rows and columns (as shown, "Table T1"). In some embodiments, the database 206 includes package data (as shown, "Package C1·P1") and stored profile definitions 220. In some embodiments, the stored profile definitions 220 are sourced (e.g., inserted) from the profile manager 214. In some embodiments, the database 206 receives object management instructions 222 from the SQL processor 210. Object management instructions 222 can include, for example, various DDL commands, such as SELECT, ALTER, etc.

The user application 208 includes any number of SQL statements and is not meant to be particularly limited. For example, the user application 208 can include the following SQL statements:

C1·P1 RELEASE(DEALLOCATE)
SELECT FROM T1
COMMIT

In some embodiments, execution results and requirements for the user application 208 are communicatively coupled to the SQL processor 210. In this manner, the various SQL statements (as shown, "SELECT FROM T1" and "COMMIT") of the user application 208 can be executed by the SQL processor 210.

As discussed previously, one or more embodiments herein describe a schema evolution workflow for a live database system whereby one or more application packages, identified as bound with a RELEASE(DEALLOCATE) option and that are dependent on the to-be-changed objects in the schema evolution, are routed to RELEASE(COMMIT) behavior. An illustrative example follows with reference to the schema evolution system 200 of FIG. 2.

Illustrative Example

Consider a scenario where user application 208 in application package C1·P1 is executed and contains, sequentially, a "SELECT FROM T1" SQL statement, a "COMMIT" SQL statement, and one or more additional SQL statements. Consider further that the application package C1·P1 is bound in the database 206 with the RELEASE(DEALLOCATE) option, which results in resources for the user application 208 to be held across commits.

According to one or more embodiments, at STEP 1 the application package C1·P1 sends the SELECT request to the SQL processor 210 which communicates with the lock manager 212 to acquire the necessary locks, in a shared state, to satisfy the SELECT statement.

Now consider a scenario whereby the DBA 204 wishes to perform a schema change request 228 for table T1. According to one or more embodiments, at STEP 2 the DBA 204 queries, via dependency query 230, the SQL processor 210 to determine which packages are dependent upon T1 and discovers the application package C1·P1. In some embodiments, the DBA 204 stores the discovered dependencies 224 (e.g., C1·P1) in an internal catalog. In some embodiments, the DBA 204 stores a pointer to the discovered dependencies 224, which themselves are stored in the database 206 and/or the RDBMS 202.

According to one or more embodiments, at STEP 3 the DBA 204 defines and enables a profile, via profile data 216 and the profile manager 214, in the database 206 that overrides the C1·P1 package release option attribute from RELEASE(DEALLOCATE) to RELEASE(COMMIT) behavior (i.e., the release option is routed to the RELEASE (COMMIT) option). In some embodiments, at STEP 4 the profile definition 218 is inserted into a profile definition (e.g., stored profile definitions 220) in the database 206.

As an additional example to the illustrative schema evolution workflow, a new application package C1·P1 instance can be started. In some embodiments, starting the new C1·P1 instance causes the SQL processor 210 to communicate with the profile manager 214 to look up the RELEASE attributes for C1·P1. Observe that, from the onset of this new instance of the user application 208, the C1·P1 application package is downgraded to RELEASE(COMMIT) due to the existing C1·P1 profile match in profiles 226. Subsequent processing of this new instance of C1·P1 is the same as if the RELEASE attribute was downgraded during commit time. In some embodiments, when the new C1·P1 application instance performs a commit, the SQL processor 210 will communicate to the lock manager 212 to release its shared locks and resources held by the user application 208.

In some embodiments, the DBA 204 initiates a schema change request 228 for table T1 in the database 206. In some embodiments, at STEP 5 the schema change request 228 results in a schema change 232 including, for example, an ALTER table T1 SQL statement submitted to the SQL processor 210. In some embodiments, the SQL processor 210 communicates with the lock manager 212 to request an exclusive lock. Note that, because the lock is held shared by C1·P1 in STEP 1, the lock manager 212 suspends the ALTER statement (i.e., STEP 5 is suspended).

The next time C1·P1 performs a commit, the SQL processor 210 communicates, at STEP 6, with the profile manager 214, which finds a profile 226 matching C1·P1 with an action of RELEASE(COMMIT). In some embodiments, the SQL processor 210 then communicates to the lock manager 212 to release the shared locks held by the user application 208. Once shared locks are released, the lock manager 212 resumes the STEP 5 ALTER statement and grants the exclusive locks and the schema change 232 can proceed.

Notably, this schema evolution workflow allows the ALTER statement to break in and perform the schema change 232 for table T1 without waiting for user application 208 to complete/terminate. In other words, a schema evolution on a live database system has been completed without an outage.

Another illustrative example follows, now with reference to a schema evolution workflow for multiple packages with mixed dependencies.

Illustrative Example—Multiple Packages

Consider a scenario where there are 3 packages (e.g., C1·P1, C1·P2, C2·P3), each bound with the RELEASE (DEALLOCATE) option, and having the following SQL statements:

Package C1·P1 depends on T1 and T2:
SELECT * FROM T1
SELECT * FROM T2
COMMIT
More SQL statements . . . .
Package C1·P2 depends on T3 and T2:
SELECT * FROM T3
SELECT * FROM T2
COMMIT
More SQL statements . . . .
Package C2·P3 depends on T1 and T3:
SELECT * FROM T1
SELECT * FROM T3
COMMIT
More SQL statements . . . .

The following events can be observed and followed when table T2 needs to be altered:

STEP 1, application thread 1, application thread 2, and application thread 3 execute packages C1·P1, C1·P2, and C2·P3, respectively.

Figure 3A:
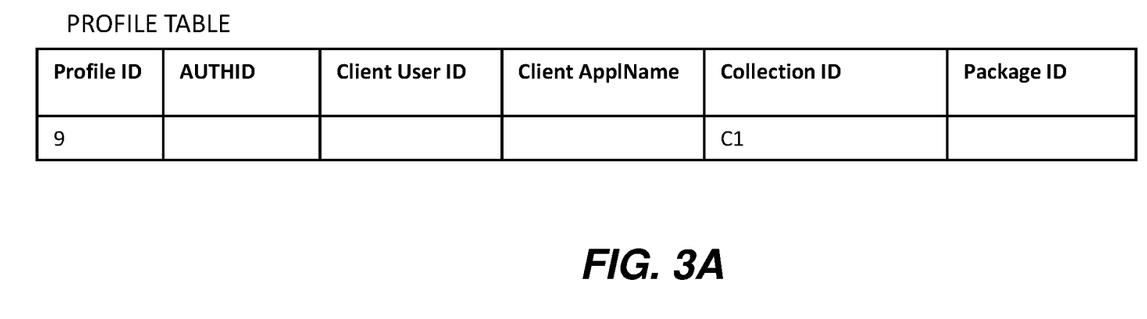
FIG. 3A depicts an example profile table in accordance with one or more embodiments.
Figure 3B:
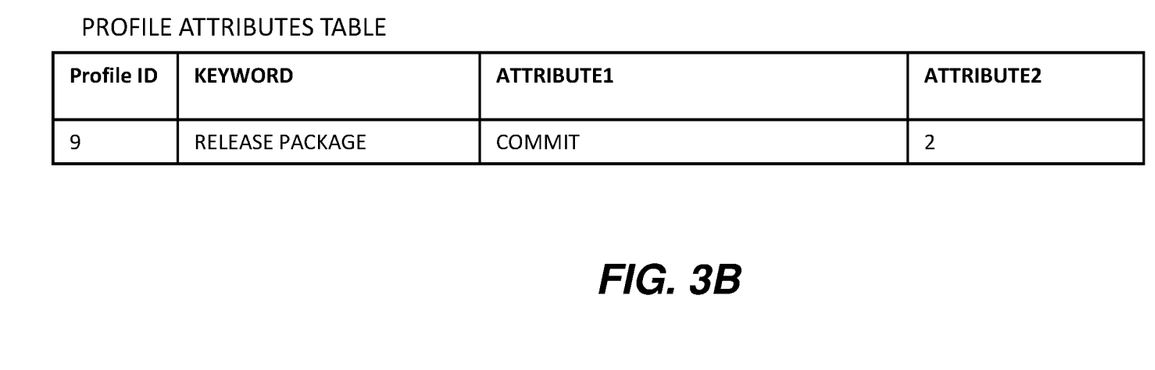
FIG. 3B depicts an example profile attributes table in accordance with one or more embodiments.

STEP 2, the DBA 204 inserts rows in the profiles 226. FIGS. 3A and 3B depict example profile and profile attributes tables, respectively, after this operation. As shown in FIG. 3A, a row denoting the profile ID "9" and collection ID "C1" has been added to the profile table.

STEP 3, the profiles 226 are enabled with a command (e.g., a START PROFILE command) by the profile manager 214. In some embodiments, the profile 9 and its respective attribute(s) (here, the keyword "RELEASE PACKAGE" and attributes "COMMIT" and "2") are read into the profile table in memory (e.g., the stored profile definitions 220).

STEP 4, existing thread 1 and thread 2 will release packages C1·P1 and C1·P2 at the end of the transaction (COMMIT option).

STEP 5, when a new thread(s) executes the first SQL statement in the C1·P1 package and/or the C1·P2 package, those packages are loaded and their RELEASE option is set to the COMMIT value, even though they were bound with the RELEASE(DEALLOCATE) attribute, as described previously herein.

STEP 6, the DBA 204 executes the following SQL statements to give the ALTER TABLE statement for table T1 a higher timeout and deadlock resolution priority:
SET CURRENT LOCK TIMEOUT=60
 (assuming the subsystem parameter was originally lower than 60, for example 30).
SET DEADLOCK RESOLUTION PRIORITY=255
ALTER TABLE T1 ADD C1 INTEGER STEP 7, after the ALTER TABLE schema change 232 completes successfully, the DBA 204 disables and/or deletes the new rows in the profile tables (refer to FIGS. 3A and 3B) of profiles 226 and then re-issues the command START PROFILE to cause the RDBMS 202 to load the profile table into a data structure in memory (e.g., the profile definitions 220 via profile manager 214). Observe that, at this point, a profile with Profile ID 9 is no longer defined. In this manner, new threads will load packages C1·P1 and C1·P2 for execution, and these packages will honor their original RELEASE (DEALLOCATE) option for best performance. In other words, the behavior has been routed back to the deallocate option.

Consider further a scenario where a user (e.g., a database administrator, such as DBA 204, or a user accessing the database 206 via the DBA 204) determines that table T3's schema needs to change. In some embodiments, the user can query the RDBMS 202 and/or database 206 to obtain the packages P2 and P3 depending on the table T3. Note that these packages are in different collection IDs (here, C1 and C2, respectively).

Figure 4A:
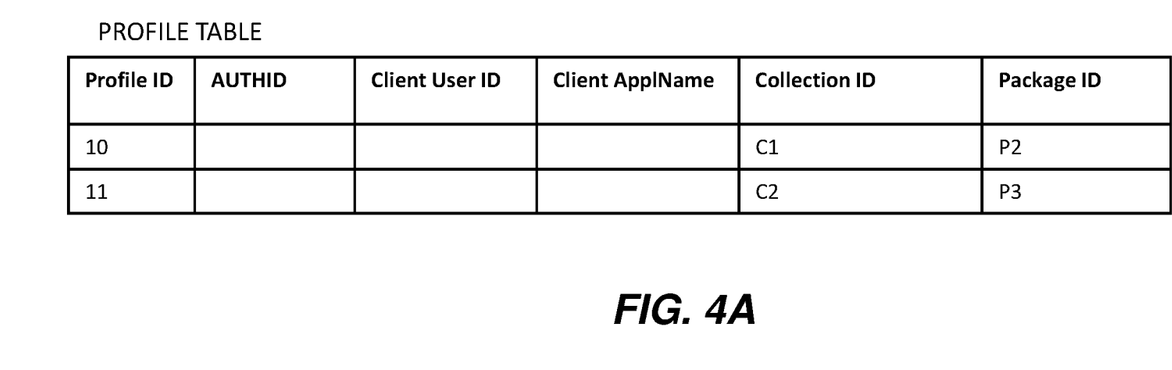
FIG. 4A depicts another example profile table in accordance with one or more embodiments.
Figure 4B:
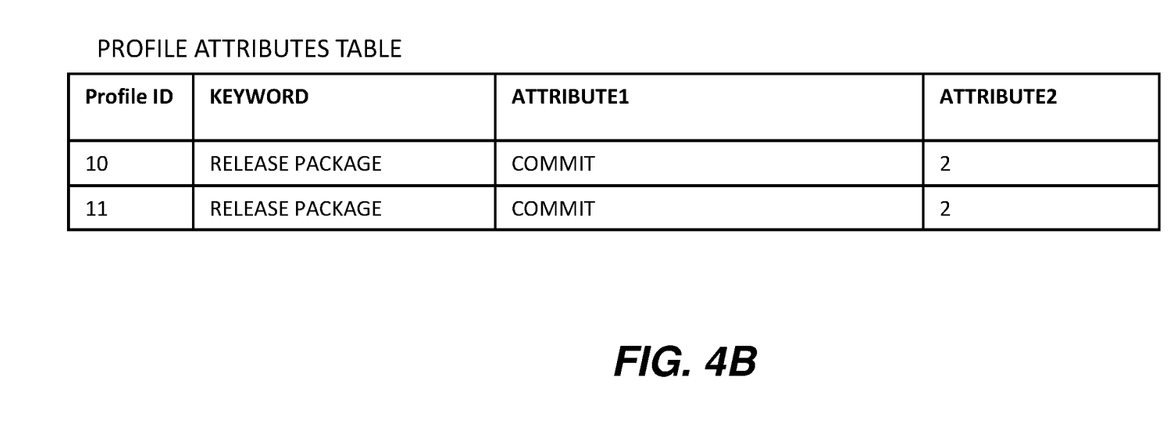
FIG. 4B depicts another example profile attributes table in accordance with one or more embodiments.

In some embodiments, the user inserts one or more rows in the profile and profile attributes tables of profiles 226. FIGS. 4A and 4B depict example profile and profile attributes tables, respectively, after this operation. As shown in FIG. 4A, a first row denoting the profile ID "10" with collection ID "C1" and package ID "P2" and a second row denoting the profile ID "11" with collection ID "C2" and package ID "P3" have been added to the profile table. As shown in FIG. 4B, a first row denoting the profile ID "10" and a second row denoting the profile ID "11", each having the keyword "RELEASE PACKAGE" and attribute "COMMIT" have been added to the profile attributes table.

As described previously, enabling the profiles 226 (distributed, e.g., in the profile table and profile attributes tables of FIGS. 4A and 4B) will result in routing existing and new threads executing package C1·P2 and C2·P3 to RELEASE (COMMIT). Notably, the profiles 226 are applicable to both local application(s) and distributed application(s) from a remote location(s). Observe that, while threads executing package C1·P1 will also look up the profiles 226, those threads are not affected (no matching rows in the profiles 226) and, advantageously, still honor the original RELEASE (DEALLOCATE) behavior. In other words, threads for C1·P2 and C2·P3 are routed to RELEASE(COMMIT) behavior without impacting threads for user applications 208 that do not depend on the schema evolution (in this example, threads for C1·P1).

In some embodiments, the profile and profile attributes tables (refer FIGS. 4A and 4B) can be read into an in-memory table (e.g., a table in database 206) to improve the performance of searching for profile matches. The data structure for such an in-memory table is not meant to be particularly limited, but can include, for example, multiple trees with hash tables and linked lists.

Yet another illustrative example follows, now expanding to embodiments where a database management service (e.g., RDBMS 202) supports special registers.

Illustrative Example—Use of Special Registers

In some embodiments, the RDBMS 202 supports special registers, which are storage used by an application to store information that can be referenced when executing SQL statements. For example, a CURRENT SCHEMA special register can specify a schema name used to qualify a previously unqualified database object reference in a dynamically prepared SQL statement. In another example, a CURRENT APPLICATION ENCODING SCHEME can specify an encoding scheme to be used for a dynamic SQL statement, both in parsing the SQL text as well as its host variable data. In this manner, an application can indicate the encoding scheme that is used to process its respective data. In yet another example, a CURRENT ROUTINE VERSION can specify a version identifier that is to be used when invoking a native SQL procedure. In some embodiments, the CURRENT ROUTINE VERSION can used for CALL statements that use a host variable to specify the procedure name. In another example, a CURRENT LOCK TIMEOUT can specify a maximum time interval a lock request in an application can wait in a contention event.

Similar to special registers, the RDBMS 202 can also support global variables, which are named memory variables that an application accesses through SQL statements. In some embodiments, global variables are shared relational data between SQL statements without the need for application logic to support data transfer. For instance, a built-in system global variable MAX LOCK PER TABLESPACE can include an integer value that specifies the default maximum number of page, row, or LOB locks that an application can simultaneously hold in a table space. In another example, a global variable DEADLOCK RESOLUTION PRIORITY can denote a relative worth value for an application which affects whether or not the application should be picked as a victim to resolve a deadlock situation against other applications.

While both global variables and special registers can be written and read by an application process, an authorization privilege is required to do so for global variables. To read the value of a special register or global variable, an SQL statement such as SELECT or SET:hostvariable can be used with the name of that special register or global variable. Various SQL statements can be used to write or set a value for a special register or global variable. For example, consider the following SQL statements.

SET CURRENT LOCK TIMEOUT=5
    SQL statement to set the CURRENT LOCK TIMEOUT special register to 5 seconds SET CURRENT SCHEMA='OF1'
    SQL statement to set the CURRENT SCHEMA special register to 'OF1'.

SET DEADLOCK RESOLUTION PRIORITY=255
    SQL statement to set the global variable DEADLOCK RESOLUTION PRIORITY to 255.

To use special registers and/or global variables, an application's source code usually needs to be changed to add, at minimum, the SET SQL statements. The application can then be compiled, bound, and tested in a test system prior to being promoted to the production system. This application development cycle takes time and can be error prone.

Figure 5A:
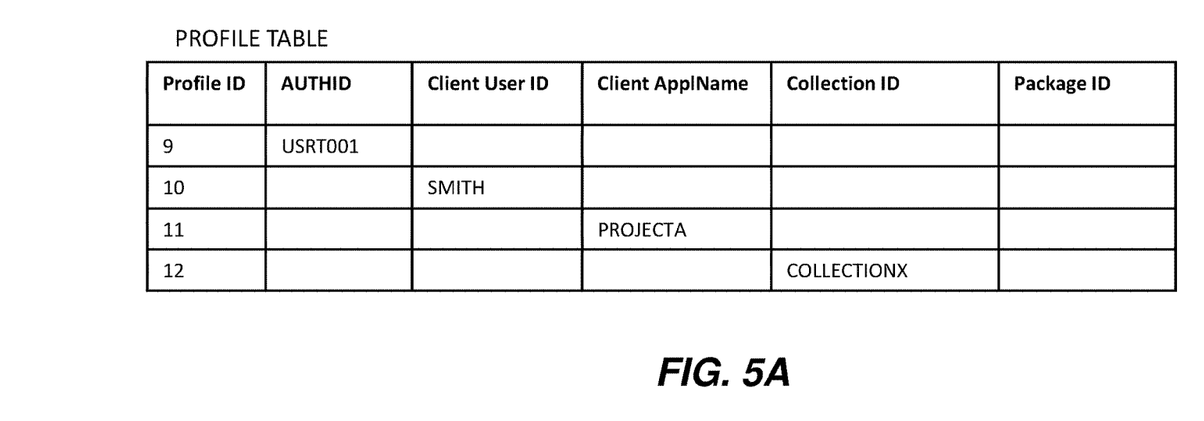
FIG. 5A depicts yet another example profile table in accordance with one or more embodiments.
Figure 5B:
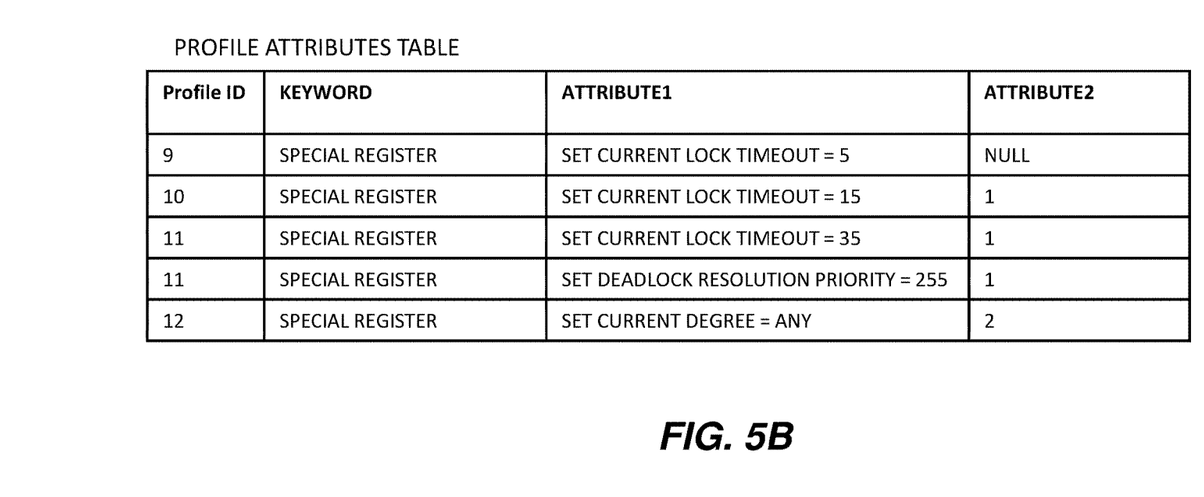
FIG. 5B depicts yet another example profile attributes table in accordance with one or more embodiments.

In some embodiments, the DBA 204 allows a user to create profiles 226 to monitor and control various aspects of the database 206 in specific application contexts. In some embodiments, a system profile is a set of criteria that identifies a specific context to a database system. Examples include threads, connections, authorization, user IDs, application plan names, and/or package names that contain SQL statements that have certain attributes. The rows in such a profile table can define any number of profiles and their associated filtering criteria. FIG. 5A depicts an example profile table having various filtering criteria. Observe that each row in the profile table of FIG. 5A has a unique profile ID. In some embodiments, the action(s) that the DBA 204 takes for processes that meet the filtering criteria for a profile in the profile table are defined by one or more rows in a profile attributes table having the same profile ID value as the respective entry in the profile table. FIG. 5B depicts an example profile attributes table for the profile table of FIG. 5A.

In some embodiments, the system profiles (e.g., profiles 226) are leveraged to identify specific applications that need to set specific special registers and global variables and to perform the write action when the applications are executed. In some embodiments, the system profile includes the in-memory profile and profile attributes tables (refer FIGS. 5A and 5B), enabled and disabled by respective commands from the DBA 204. In this manner, a thread executing applications can quickly look up, via the system profiles, whether a particular profile is applicable to the thread and if so, can take the directed action. Advantageously, this type of automatic profile-apply workflow avoids a lengthy application change process and provides flexibility to undo the special register and global variable settings at any time.

Figure 6:
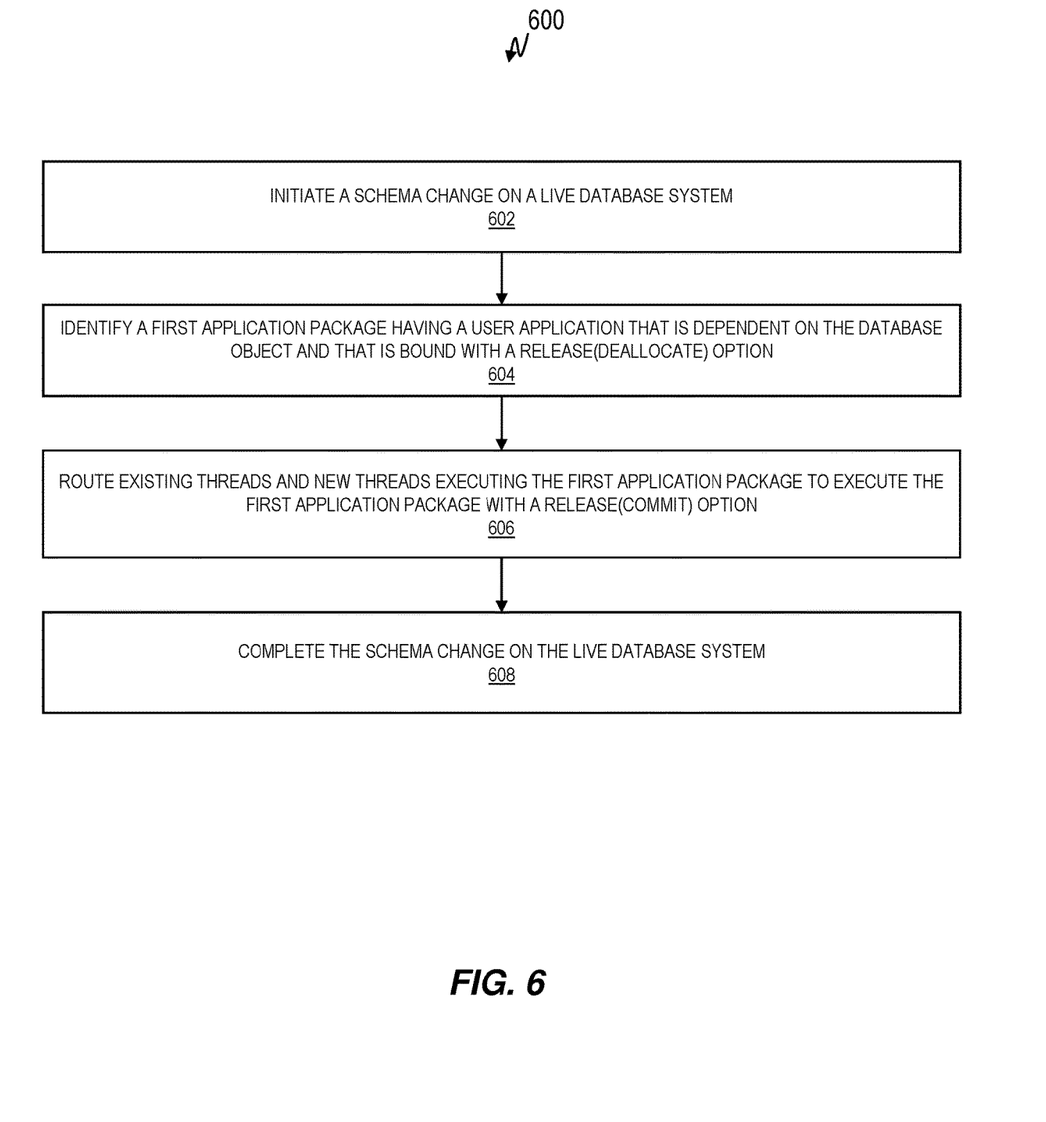
FIG. 6 is a flowchart in accordance with one or more embodiments of the present invention.

Referring now to FIG. 6, a flowchart 600 for providing a schema evolution on a live database system without an outage is generally shown according to an embodiment. The flowchart 600 is described in reference to FIGS. 1-5B and may include additional blocks not depicted in FIG. 6. Although depicted in a particular order, the blocks depicted in FIG. 6 can be rearranged, subdivided, and/or combined.

At block 602, a schema change is initiated on a live database system. In some embodiments, the schema change includes an attribute change for a database object. In some embodiments, the schema change includes a DDL ALTER SQL statement.

In some embodiments, the DDL alter SQL statement and the existing threads and new threads executing the first application package run concurrently. In some embodiments, the database object is a table and the DDL ALTER SQL statement denotes a change to the attribute include at least one of an added column, an added row, a removed column, a removed row, an inserted value, and a deleted value to the table.

At block 604, a first application package having a user application that is dependent on the database object and that is bound with a release(deallocate) option is identified.

At block 606, existing threads and new threads executing the first application package are routed to execute the first application package with a release(commit) option.

At block 608, the schema change is completed on the live database system. In some embodiments, one or more additional threads concurrently executing one or more additional application packages remain executing, throughout the entire schema change initiation to schema change completion workflow, with the release(deallocate) option. In some embodiments, completing the schema change comprises breaking in the DDL ALTER SQL statement to perform the schema change without waiting for the first application package to complete.

In some embodiments, the one or more additional threads concurrently executing one or more additional application packages include a second application package having a user application that is not dependent on the database object. In some embodiments, the second application package is bound with a release(deallocate) option. In some embodiments, responsive to completing the schema change on the live database system, the existing threads and new threads executing the first application package are routed back to the release(deallocate) option.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/ connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    initiating a schema change on a live database system, the schema change comprising an attribute for a database object;
    during the schema change, identifying a first application package comprising a user application that is dependent on the database object, the first application package bound with a release (deallocate) option;
    during the schema change, routing existing threads and new threads executing the first application package to execute the first application package with a release (commit) option; and
    completing the schema change on the live database system;
    wherein one or more additional threads concurrently executing one or more additional application packages remain executing with the release (deallocate) option.

2. The computer-implemented method of claim 1, wherein the schema change further comprises a data definition language (DDL) ALTER structured query language (SQL) statement.

3. The computer-implemented method of claim 2, wherein the DDL ALTER SQL statement and the existing threads and new threads executing the first application package run concurrently.

4. The computer-implemented method of claim 2, wherein the database object comprises a table and the DDL ALTER SQL statement comprises a change to the attribute comprising at least one of an added column, an added row, a removed column, a removed row, an inserted value, and a deleted value to the table.

5. The computer-implemented method of claim 2, wherein completing the schema change comprises breaking in the DDL ALTER SQL statement to perform the schema change without waiting for the first application package to complete.

6. The computer-implemented method of claim 1, wherein the one or more additional threads concurrently executing one or more additional application packages comprise a second application package comprising a user application that is not dependent on the database object, the second application package bound with a release (deallocate) option.

7. The computer-implemented method of claim 1, further comprising, responsive to completing the schema change on the live database system, routing the existing threads and new threads executing the first application package back to the release (deallocate) option.

8. A system having a memory, computer readable instructions, and one or more processors for executing the computer readable instructions, the computer readable instructions controlling the one or more processors to perform operations comprising:
    initiating a schema change on a live database system, the schema change comprising an attribute for a database object;
    during the schema change, identifying a first application package comprising a user application that is dependent on the database object, the first application package bound with a release (deallocate) option;
    during the schema change, routing existing threads and new threads executing the first application package to execute the first application package with a release (commit) option; and
    completing the schema change on the live database system;
    wherein one or more additional threads concurrently executing one or more additional application packages remain executing with the release (deallocate) option.

9. The system of claim 8, wherein the schema change further comprises a data definition language (DDL) ALTER structured query language (SQL) statement.

10. The system of claim 9, wherein the DDL ALTER SQL statement and the existing threads and new threads executing the first application package run concurrently.

11. The system of claim 9, wherein the database object comprises a table and the DDL ALTER SQL statement comprises a change to the attribute comprising at least one of an added column, an added row, a removed column, a removed row, an inserted value, and a deleted value to the table.

12. The system of claim 9, wherein completing the schema change comprises breaking in the DDL ALTER SQL statement to perform the schema change without waiting for the first application package to complete.

13. The system of claim 8, wherein the one or more additional threads concurrently executing one or more additional application packages comprise a second application package comprising a user application that is not dependent on the database object, the second application package bound with a release (deallocate) option.

14. The system of claim 8, further comprising, responsive to completing the schema change on the live database system, routing the existing threads and new threads executing the first application package back to the release (deallocate) option.

15. A computer program product comprising a computer readable storage medium having program instructions embodied therewith, the program instructions executable by one or more processors to cause the one or more processors to perform operations comprising:
    initiating a schema change on a live database system, the schema change comprising an attribute for a database object;
    during the schema change, identifying a first application package comprising a user application that is dependent on the database object, the first application package bound with a release (deallocate) option;
    during the schema change, routing existing threads and new threads executing the first application package to execute the first application package with a release (commit) option; and
    completing the schema change on the live database system;
    wherein one or more additional threads concurrently executing one or more additional application packages remain executing with the release (deallocate) option.

16. The computer program product of claim 15, wherein the schema change further comprises a data definition language (DDL) ALTER structured query language (SQL) statement.

17. The computer program product of claim 16, wherein the DDL ALTER SQL statement and the existing threads and new threads executing the first application package run concurrently.

18. The computer program product of claim 16, wherein completing the schema change comprises breaking in the DDL ALTER SQL statement to perform the schema change without waiting for the first application package to complete.

19. The computer program product of claim 15, wherein the one or more additional threads concurrently executing one or more additional application packages comprise a second application package comprising a user application that is not dependent on the database object, the second application package bound with a release (deallocate) option.

20. The computer program product of claim 15, further comprising, responsive to completing the schema change on the live database system, routing the existing threads and new threads executing the first application package back to the release (deallocate) option.

* * * * *